United States Patent
Sasanuma et al.

[11] Patent Number: 6,091,512
[45] Date of Patent: Jul. 18, 2000

[54] IMAGE PROCESSING APPARATUS AND METHOD FOR IMPROVING IMAGE REPRODUCIBILITY

[75] Inventors: Nobuatsu Sasanuma, Mishima; Yukio Watanabe, Machida; Tetsuya Atsumi, Susono; Yuichiro Toyohara, Fujisawa, all of Japan

[73] Assignee: Canon Kabushiki Kaisha, Tokyo, Japan

[21] Appl. No.: 08/938,450

[22] Filed: Sep. 29, 1997

[30] Foreign Application Priority Data

Sep. 30, 1996 [JP] Japan .................................. 8-259901

[51] Int. Cl.[7] ....................................................... G06K 9/00

[52] U.S. Cl. ............................ 358/1.9; 347/254; 358/300

[58] Field of Search ................................... 395/107–109; 382/169; 399/74; 347/131, 181, 254; 358/300, 1.7–1.9

[56] References Cited

U.S. PATENT DOCUMENTS

| | | | |
|---|---|---|---|
| 4,800,442 | 1/1989 | Riseman et al. | 358/280 |
| 4,873,428 | 10/1989 | Takeuchi et al. | 250/214 DC |
| 5,818,498 | 10/1998 | Richardson et al. | 347/237 |

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An image processing apparatus for subjecting input image data to a density conversion includes three dot isolation circuits which subject the pixels on each of a plurality of lines adjoining in the sub-scan direction to a density conversion in accordance with a different predetermined conversion characteristic (LUT) for each line. Though each dot separation circuit deals with a different number of lines of image data to undergo a density conversion, the predetermined conversion characteristics can be set in advance in such a manner that the density values of a plurality of pixels on adjoining line will be preserved if an overall view of the reproduced image is taken.

43 Claims, 18 Drawing Sheets

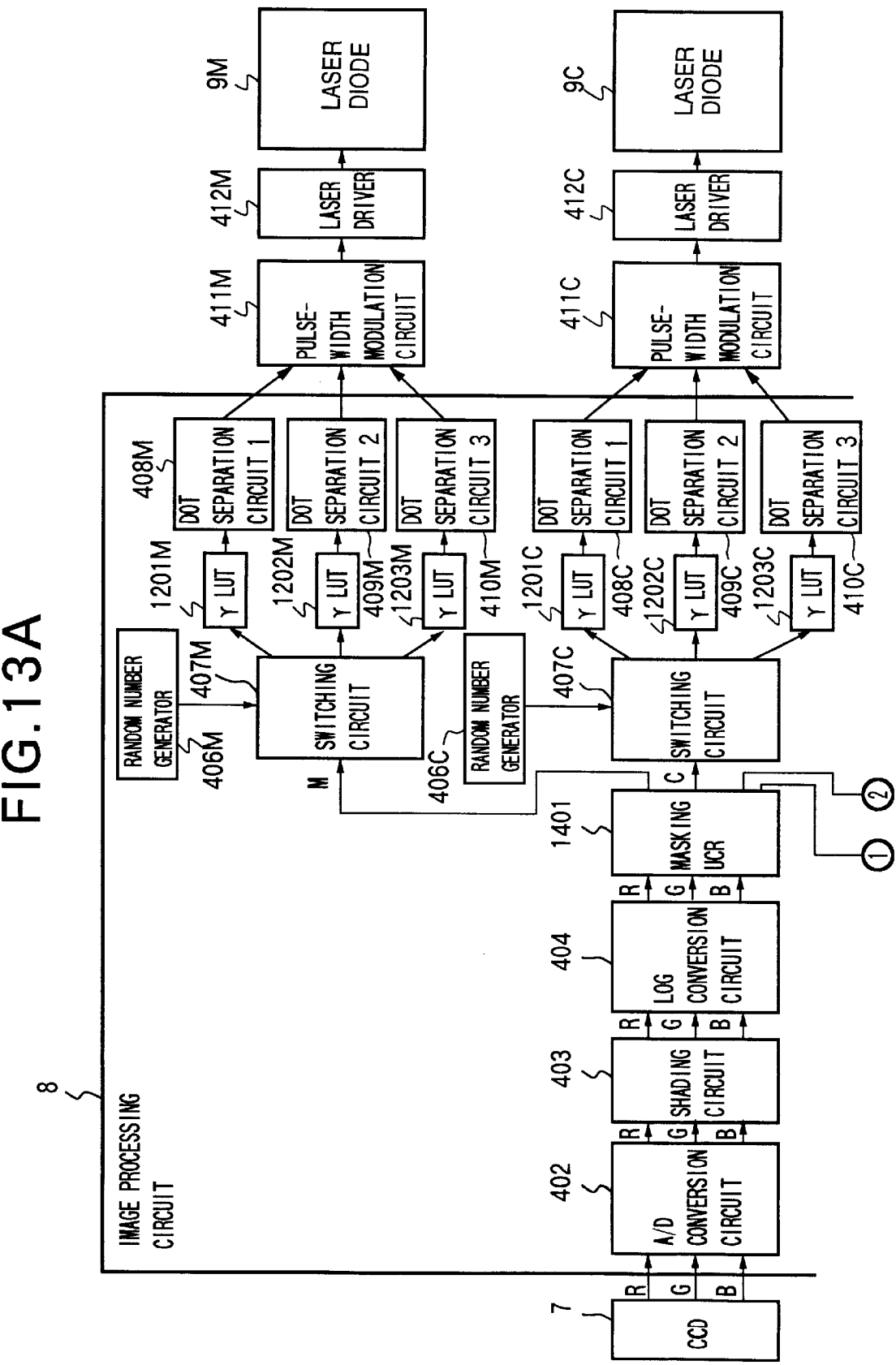

IMAGE PROCESSING APPARATUS AND METHOD FOR IMPROVING IMAGE REPRODUCIBILITY

BACKGROUND OF THE INVENTION

This invention relates to an image processing method, apparatus and medium, e.g. a method, apparatus and medium for subjecting input image data to density conversion processing.

One example of a typical image processing apparatus widely used in the prior art is an electrophotography-type apparatus using laser exposure.

In such an apparatus for forming images electrophotographically by laser exposure, excellent halftone grayscale expression is achieved by reproducing a grayscale image having a resolution of 200 dpi (dots per inch) in the main-scan direction of the laser beam and 400 dpi in the sub-scan direction (which is perpendicular to the main-scan direction) as the output image using an image signal having a resolution of 400 dpi in the main-scan direction and 400 dpi in the sub-scan direction, by way of example. In a case where an image that includes characters or lines is reproduced, the edges of characters or lines are reproduced in excellent fashion by making the resolution in the main-scan direction of the output image 400 dpi and the resolution in the sub-scan direction of the output image 400 dpi.

In certain image forming apparatus, images are reproduced at a resolution of 400 dpi in the main-scan direction and 400 dpi in the sub-scan direction in a copy mode wherein importance is placed on character reproduction, as when copying characters and maps, in comparison with the reproduction of images at a resolution of 200 dpi in the main-scan direction and 400 dpi in the sub-scan direction in an operating mode wherein emphasis is placed on halftoning, as when copying photographs that have been printed out or photographs appearing on photographic paper.

A copier has been proposed for dealing with a case where the image of a document contains characters and photographs. Such a copier subjects the edge of a character or fine line to area discrimination, performs image reproduction at 200 dpi in the main-scan direction and 400 dpi in the sub-scan direction in an area determined to be that of a grayscale image and performs image reproduction at 400 dpi in the main-scan direction and 400 dpi in the sub-scan direction in an area determined to be that of a character or fine line.

However, in view of the needs of users seeking images reproduced at higher image quality, it is expected that expression of the grayscale at 600 dpi will predominate in digital-type eletrophotographic printers.

If the space needed for one pixel is considered to be a square, one side of the square will have a length of 42.2 $\mu$m for a resolution of 600 dpi in comparison with a length of 63.5 $\mu$m for a resolution of 400 dpi. Accordingly, the specifications of the laser optical system and photosensitive drum should be optimized in terms of the diameter of the laser-beam spot and in terms of preventing the scattering of light on the photosensitive drum in order to deal with an increase in resolution to 600 dpi. However, redesigning the apparatus upon taking into account even the characteristics of the elements and materials used is not realistic when cost is considered. When, for this reason, resolution is changed from 400 dpi to 600 dpi using the currently existing basic arrangement of components for grayscale reproduction at 400 dpi, a problem which arises is that the amount of overlap between neighboring pixels becomes too large if exposure is performed by scanning with a laser beam diameter of 50 $\mu$m in the main-scan direction and 65 $\mu$m in the sub-scan direction, even though such a beam spot diameter is optimum for 400 dpi. This problem will be described with reference to FIGS. 1 and 2.

A laser-beam spot diameter 201 is designed to be 50×65 $\mu$m so as to be optimized for a pixel 202 formed by a grid of 400 dpi. Under these conditions there is almost no overlap in the sub-scan direction (FIG. 1). However, if this optical system is employed as is and an image is formed by a pixel 203 composed of a grid of 600 dpi, an area in which neighboring pixels overlap is produced, as indicated by the shaded portion in FIG. 2.

If such overlapping portions exist, periodic pitch unevenness will appear in the output image in the sub-scan direction in the event that the traveling speed of the photosensitive drum in the sub-scan direction is not uniform, namely in a case where the precision at which the rotating speed of the drum is controlled declines in the system in which the photosensitive drum rotates.

Even when a digital latent image expressed by area modulation is formed by a plurality of isolated dots, the characteristic will approach that of an analog latent image if neighboring dots overlap in the manner described above. The end result is that it is difficult to realize optimum grayscale reproduction.

SUMMARY OF THE INVENTION

Accordingly, an object of the present invention is to provide an image processing method, apparatus and storage medium through which a high-quality image can be formed by controlling a density conversion characteristic.

According to the present invention, the foregoing object is attained by providing an image processing method for subjecting line-direction image data of first through nth neighboring lines in image data to a density conversion and generating data for image formation, comprising a density conversion step of subjecting each of the first through nth lines of line-direction image data to a density conversion using a different conversion characteristic for each line, wherein n is made variable in the density conversion of the image data of the first through nth lines in the density conversion step.

According to another aspect of the present invention, the foregoing object is attained by providing an image processing method for subjecting line-direction image data of first through nth neighboring lines in image data to a density conversion and generating data for image formation, comprising a first density conversion step of subjecting each of first through xth lines of line-direction image data to a density conversion using a different conversion characteristic for each line, a second density conversion step of subjecting each of first through yth lines of line-direction image data to a density conversion using a different conversion characteristic for each line, and a third density conversion step of subjecting each of first through zth lines of line-direction image data to a density conversion using a different conversion characteristic for each line, wherein x, y and z are numbers that differ from one another, density conversion is performed upon randomly selecting any of the first through third density conversion steps, and density conversion of the image data from the first through the nth lines is executed by repeating the random selection of the density conversion steps.

According to another aspect of the present invention, the foregoing object is attained by providing an image processing method for subjecting line-direction image data of first through nth neighboring lines in image data to a density conversion and generating data for image formation, comprising a plurality of density conversion steps from first through Mi-th (i=1, 2, ..., m) density conversion steps of subjecting each of first through Xi-th (i=1, 2, ..., m) lines of line-direction image data to a density conversion using a different conversion characteristic for each line, wherein density conversion is performed upon randomly selecting any of density conversion steps up to the Mi-th (i=1, 2, ..., m) density conversion step, and density conversion of the image data from the first through the nth lines is executed by repeating the random selection of the density conversion steps.

In each of the arrangements described above, the conversion characteristics preferably are set to emphasize density with regard to the first line of line-direction image data and to gradually reduce, in the direction from the first line through the nth (or Xi-th) line, degree of emphasis of density with regard to the line-direction image data from the line following the first line through the nth (or Xi-th) line.

In a preferred embodiment, image data that undergoes a density conversion at each of the density conversion steps up to the Mi-th (i=1, 2, ..., m) step is subjected in advance to a γ conversion using a γ characteristic that is different for each density conversion step.

Further, and by way of example, the image data is color data and the data of each color component of the color image data preferably is subjected to a density conversion at each of the density conversion steps up to the Mi-th (i=1, 2, ..., m) density conversion step.

According to other aspects of the present invention, the foregoing object is attained by providing an image processing apparatus and a computer readable storage medium which implement the methods described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 13A and 13B are diagrams showing the construction of a second embodiment of the present invention;

DESCRIPTION OF THE PREFERRED EMBODIMENTS

The construction of an image processing apparatus according to embodiments of the present invention will now be described in detail.

[First Embodiment]

Figure 1:
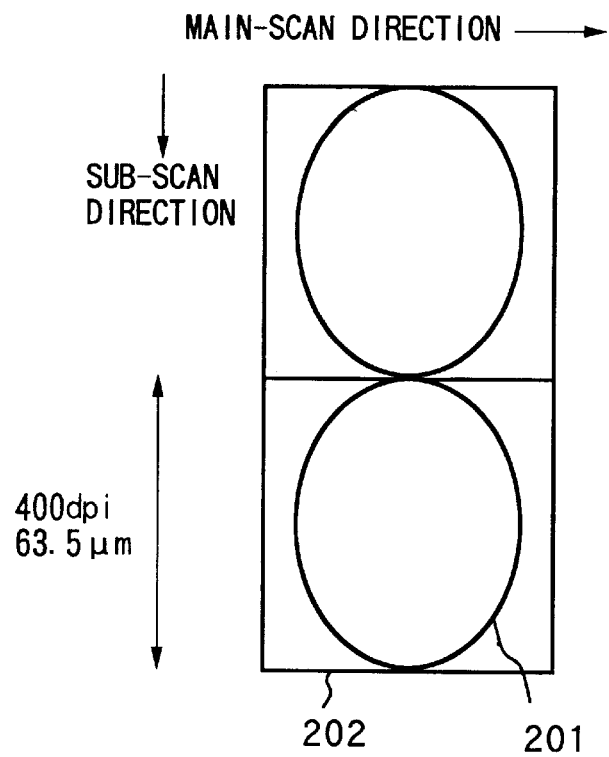
FIG. 1 is a diagram showing the relationship between laser-beam size and pixel size at 400 dpi ×400 dpi.
Figure 2:
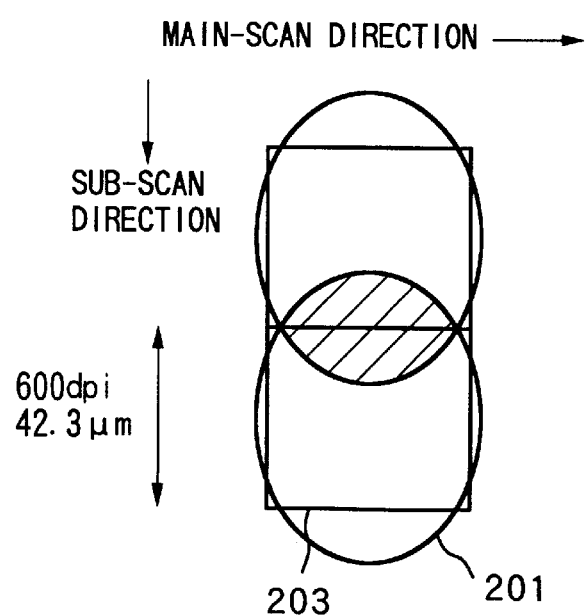
FIG. 2 is a diagram showing the relationship between laser-beam size and pixel size at 600 dpi ×600 dpi.
Figure 3:
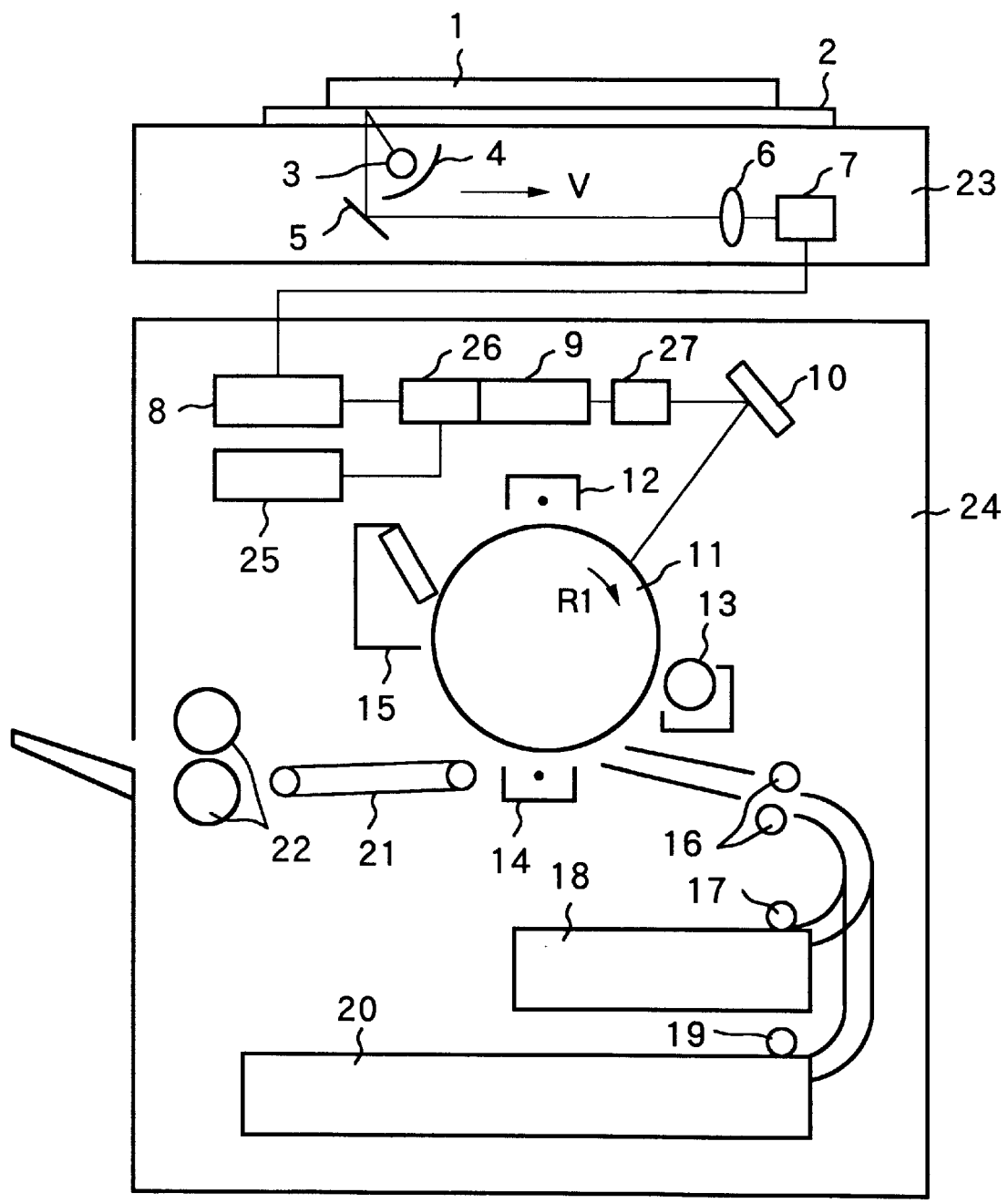
FIG. 3 is a diagram showing the general construction of an image processing apparatus embodying the present invention.

The construction of an electrophotographic digital copier (referred to simply as a copier below) serving as an image processing apparatus according to a first embodiment of the present invention will now be described with reference to FIG. 1.

The copier is constituted by a reading apparatus 23 and an image forming apparatus 24.

The reading apparatus 23 has a glass platen 2 on which a document 1 is placed to be illuminated by a light source 3 and reflecting mirror 4. Light reflected by the document 1 has its optical path changed by a mirror 5 so that the light is focused by an optical lens 6, whereby an image is formed on a CCD (charge-coupled device) line sensor (referred to simply as a CCD below) arrayed in one dimension. By moving the light source 3, reflecting mirror 4 and mirror 5 in the direction of arrow V, the image of the document can be acquired in two dimensions.

It should be noted that the copier is capable of reading documents up to size A3.

The user of the copier is capable of setting the desired copy paper size on a control panel, not shown. In some cases it is possible to set a zoom (scaling) ratio in order to make an image fit the prescribed paper size.

Figure 4:
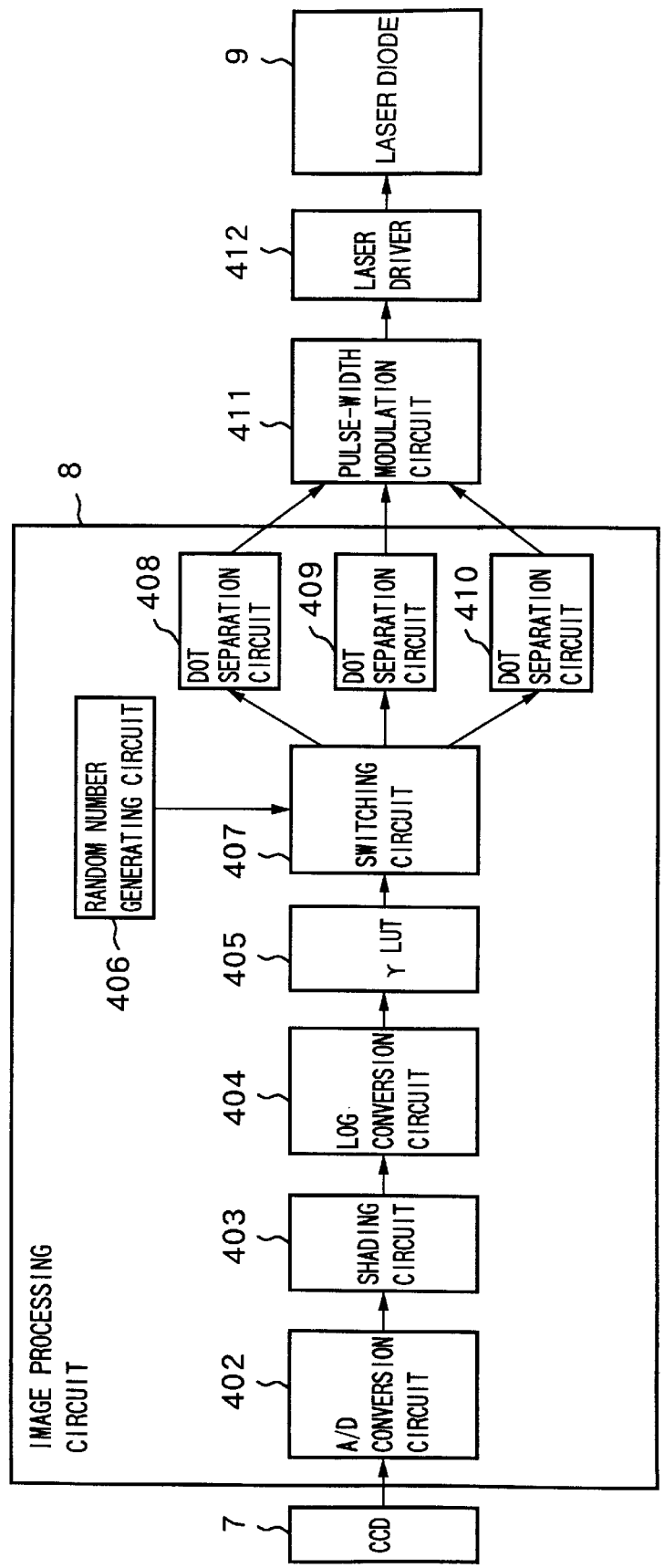
FIG. 4 is a diagram showing the construction of an image processing apparatus according to a first embodiment of the invention.

The image signal obtained by the CCD 7 is processed by each of the units in an image processing circuit 8, the details of which are shown in FIG. 4, and the processed signal is sent to a laser diode 9. The cell pitch and read timing of the CCD 7 are designed in such a manner that the CCD will produce image data having a resolution of 600 dpi in both the main- and sub-scan directions when the document is read in.

The flow of the image signal will now be described with reference to FIG. 4.

The light received by the CCD 7 is converted to digital image data (referred to simply as "image data" below) by an A/D conversion circuit 402, whence the image data enters a shading circuit 403 that corrects for a variance in sensitivity from one CCD cell to another in the thrust direction of the CCD 7.

The image data corrected by the shading circuit 403 is converted to a density scale by a LOG conversion circuit 404, whence the data enters a printer γ LUT circuit 405, which compensates for the non-linear portion of the printer grayscale characteristic. It should be noted that these circuits are ordinary and the operation thereof need not be described in detail.

Dot separation circuits 408, 409, 410 are provided on the output side of the printer γ LUT circuit 405.

The dot separation circuits 408, 409, 410 subject the image data [multilevel (256-level in this embodiment) image data] corrected by the printer γ LUT circuit 405 to a density conversion in accordance with predetermined conversion characteristics that differ for each line. The conversion is applied to the pixels on a plurality of neighboring lines arrayed in the sub-scan direction.

The density converting functions of the dot separation circuits 408, 409, 410 will be described later. In regard to the basic operation of the three dot separation circuits, a case in which the pixels on two lines neighboring in the sub-scan direction are subjected to a density conversion will be described as an example.

Multilevel image data enters each dot separation circuit as digital data representing the density level of a pixel. The dot separation circuit first subjects a plurality of pixels on a certain line (line N) in the sub-scan direction to a density conversion which reduces the level value of the low-density area of the image data that represents these pixels. Next, in order to compensate the line (N+1) neighboring the line N for the amount of density level reduction owing to the density conversion applied to the plurality of pixels on line N, the dot separation circuit subjects a plurality of pixels on line (N+1) to a density conversion which makes the above-mentioned level value of the low-density area larger for the image data that represents these pixels.

If such density conversion processing is executed, neighboring pixels in the sub-scan direction can be prevented from overlapping. In addition, when an overall view of line N and line (N+1) is taken, the density values of the plurality of pixels on these two lines can be preserved or, alternatively, a desired density area can be emphasized.

A switching circuit 407 selects which of the dot separation circuits 408, 409, 410 is to be used. A pseudo-random number generated by a random number generator 406 enters the switching circuit 407, which randomly selects the dot separation circuit that corresponds to the pseudo-random number.

Image data modulated by the selected dot separation circuit is converted by a pulse-width modulation circuit 411 to a laser emission pattern capable of area modulation reproduction.

The image data that has been converted to the laser emission pattern is delivered to the laser diode 9 via a laser driver circuit 412.

The light emitted by the laser diode 9 in conformity with the driving pulse width irradiates a photosensitive drum 11, which is rotating in the direction of an arrow R1, via a mirror 10 while the optical path thereof is scanned by a rotating polygon mirror having a scanning exposure device 27.

Provided about the photosensitive drum 11 are a corona discharge unit 12 for uniformly charging the surface of the photosensitive drum 11 along its direction of rotation, a developing unit 13 for forming a toner image by causing toner to attach itself to a latent image formed on the photosensitive drum 11, a transfer corona discharge unit 14 for transferring the toner image from the photosensitive drum 11 to a transfer member, and a cleaning unit 15 which recovers toner remaining on the photosensitive drum 11 after transfer.

The main body 24 of the printer accommodates a loaded paper cassette 18 in which small-size transfer paper is stacked and a loaded paper cassette 20 in which large-size transfer paper is stacked. Paper is fed from either of the cassettes in accordance with the designated paper size.

The transfer paper from the cassette 18 or 19 picked up by pick-up rollers 17, 19 is thrust between the photosensitive drum 11 and transfer corona discharge unit 14 by a registration roller 16 in sync with the toner image on the photosensitive drum 11.

After the toner image is transferred to the transfer paper, the toner is fused and fixed to the transfer paper by a group 22 of thermal pressure rollers. The transfer paper is then discharged from the machine to complete the image formation process.

<Dot Separation Processing>

Processing for dot separation in the sub-scan direction in a low-density area of image data will now be described.

The description will be rendered with reference to FIGS. 5 through 10. For the sake of simplicity, a case will be described in which the dot separation circuits 408, 409, 410 are selected in regular order by the switching circuit 407.

Figure 5:
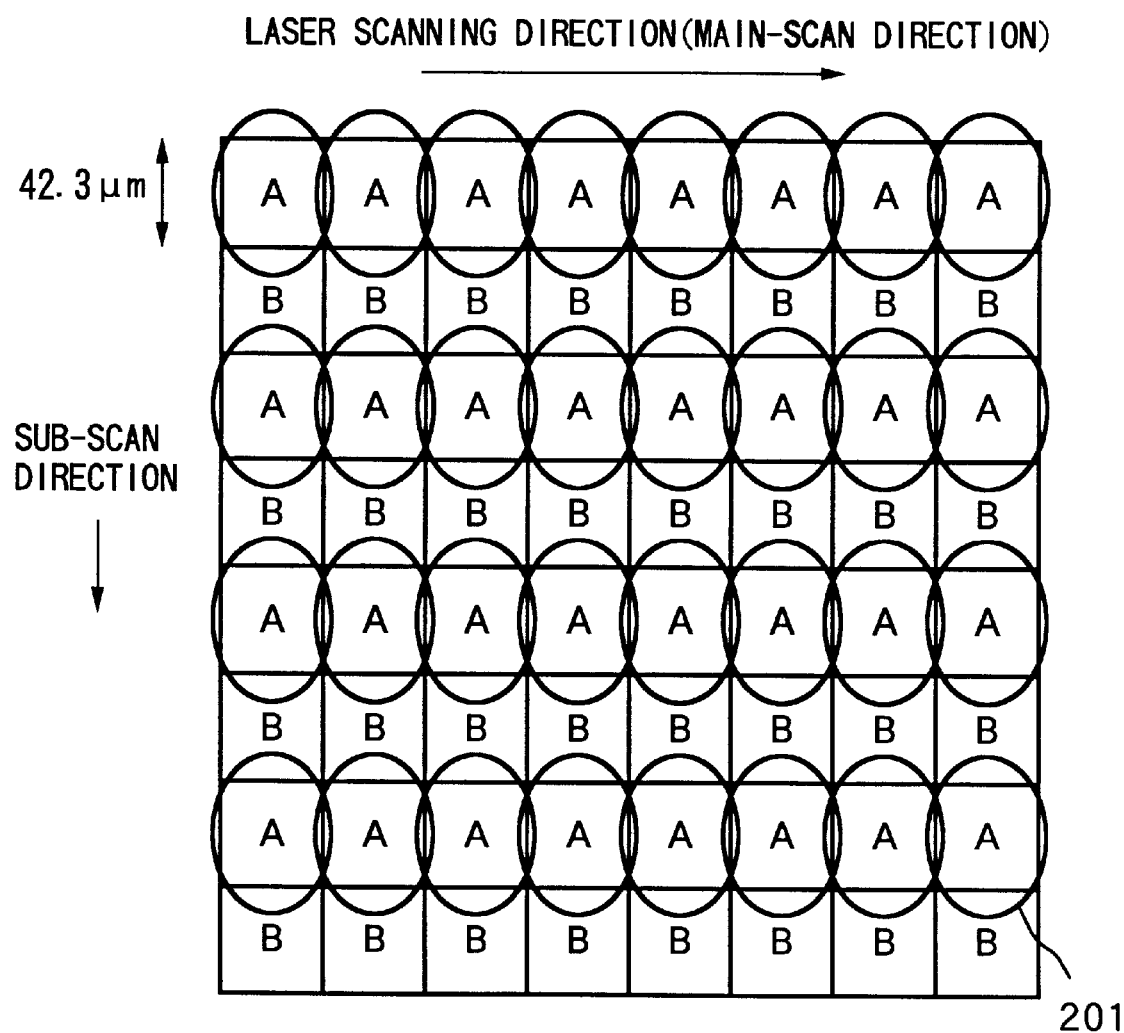
FIG. 5 is a diagram showing a dot growth pattern according to first dot separation.

FIG. 5 is a diagram useful in describing the processing executed by the dot separation circuit 408.

The direction of the arrow at the top of FIG. 5 indicates the direction in which the laser beam is scanned (this is the main-scan direction). Since the resolution is 600 dpi, one side of a pixel has a length of 42.3 μm.

When the switching circuit 407 has selected the dot separation circuit 408, two successive lines of image data in the main-scan direction enter the dot separation circuit 408 from the switching circuit 407.

Image data corresponding to a group of pixels "A" on a first line in the main-scan direction in FIG. 5 enters a first look-up table (LUT), which is incorporated in the dot separation circuit 408, from the switching circuit 407. (The first LUT is not shown and neither are the LUTs mentioned below.) The first LUT subjects the input image data to a density conversion in accordance with an input/output characteristic 4000 shown in FIG. 6.

Image data corresponding to a group of pixels "B" on a second line enters a second LUT, which is incorporated in the dot separation circuit 408, from the switching circuit 407. The second LUT subjects the input image data to a density conversion in accordance with an input/output characteristic 4001 shown in FIG. 6.

When the switching circuit 407 has selected the dot separation circuit 409, three successive lines of image data enter the dot separation circuit 409 from the switching circuit 407.

Figure 7:
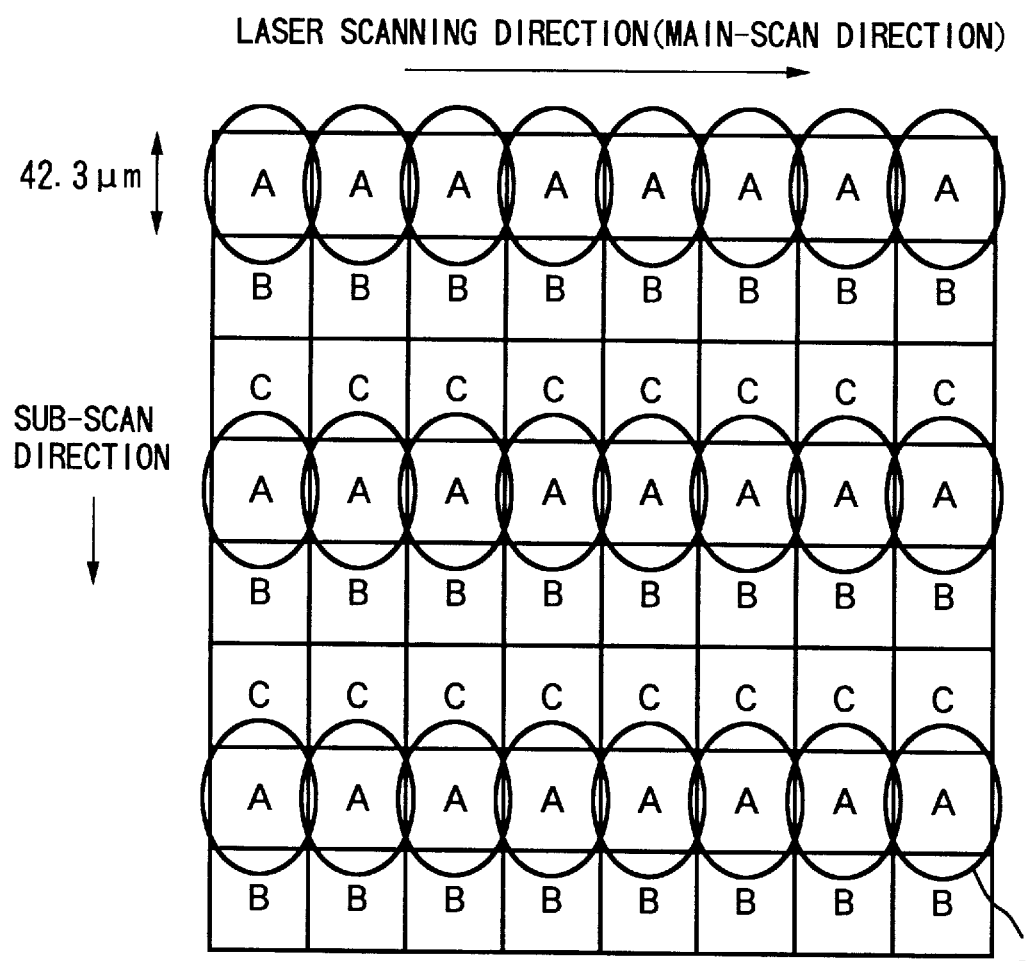
FIG. 7 is a diagram showing a dot growth pattern according to second dot separation.

FIG. 7 illustrates the method of processing executed by the dot separation circuit 409.

Image data corresponding to a group of pixels "A" on a first line in the main-scan direction in FIG. 7 enters a third LUT, which is incorporated in the dot separation circuit 409, from the switching circuit 407. The third LUT subjects the input image data to a density conversion in accordance with an input/output characteristic 4002 shown in FIG. 8.

Image data corresponding to a group of pixels "B" on a second line in the main-scan direction enters a fourth LUT, which is incorporated in the dot separation circuit 409, from the switching circuit 407. The fourth LUT subjects the input image data to a density conversion in accordance with an input/output characteristic 4003 shown in FIG. 8.

Image data corresponding to a group of pixels "C" on a third line in the main-scan direction enters a fifth LUT, which is incorporated in the dot separation circuit 409, from the switching circuit 407. The fifth LUT subjects the input image data to a density conversion in accordance with an input/output characteristic 4004 shown in FIG. 8.

When the switching circuit 407 has selected the dot separation circuit 410, four successive lines of image data enter the dot separation circuit 410 from the switching circuit 407.

Figure 9:
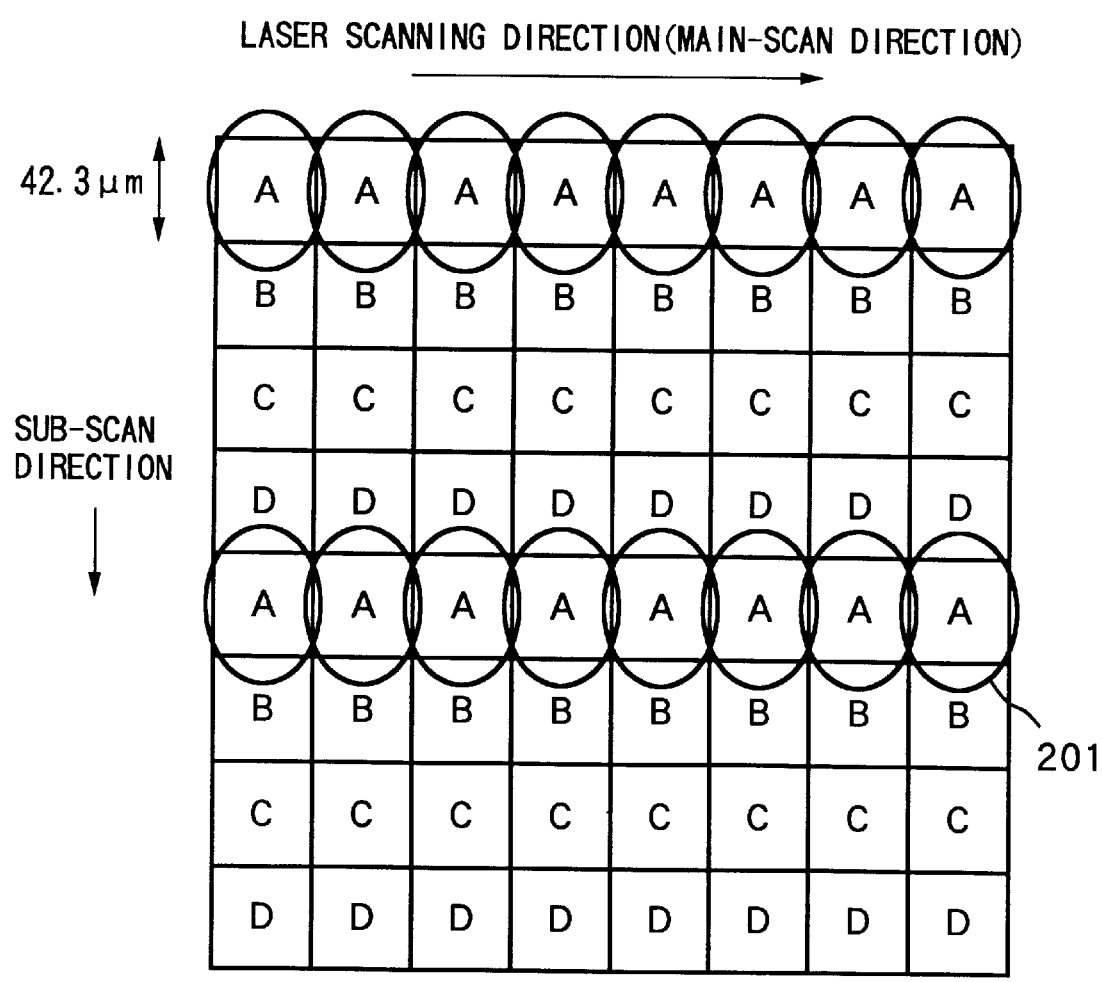
FIG. 9 is a diagram showing a dot growth pattern according to third dot separation.

FIG. 9 illustrates the method of processing executed by the dot separation circuit 410.

Image data corresponding to a group of pixels "A" on a first line in the main-scan direction in FIG. 9 enters a sixth LUT, which is incorporated in the dot separation circuit 410, from the switching circuit 407. The sixth LUT subjects the input image data to a density conversion in accordance with an input/output characteristic 4005 shown in FIG. 10.

Image data corresponding to a group of pixels "B" on a second line in the main-scan direction enters a seventh LUT, which is incorporated in the dot separation circuit 410, from the switching circuit 407. The seventh LUT subjects the input image data to a density conversion in accordance with an input/output characteristic 4006 shown in FIG. 10.

Image data corresponding to a group of pixels "C" on a third line in the main-scan direction enters an eighth LUT, which is incorporated in the dot separation circuit 410, from the switching circuit 407. The eighth LUT subjects the input image data to a density conversion in accordance with an input/output characteristic 4007 shown in FIG. 10.

Image data corresponding to a group of pixels "D" on a fourth line in the main-scan direction enters a ninth LUT, which is incorporated in the dot separation circuit 410, from the switching circuit 407. The ninth LUT subjects the input image data to a density conversion in accordance with an input/output characteristic 4008 shown in FIG. 10.

Next, a case in which the switching circuit 407 is changed over randomly will be described with reference to FIG. 11.

Figure 11:
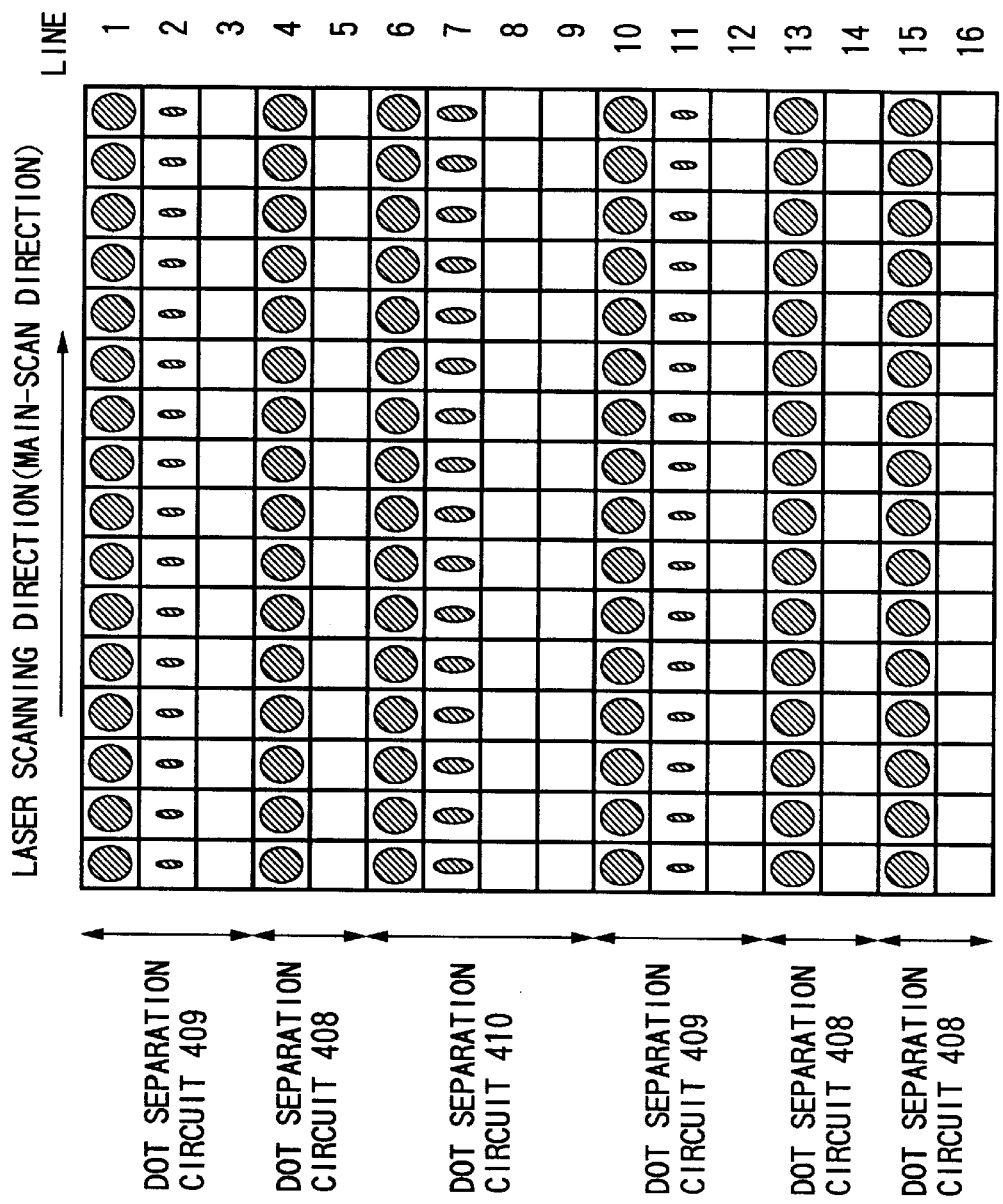
FIG. 11 is a diagram illustrating an example of dot patterns in a low-density uniform pattern according to the first embodiment.

FIG. 11 is a diagram illustrating low-density dot patterns obtained in a case where the dot separation circuits 408, 409, 410 are switched among randomly by the switching circuit 407. The sizes of the black dots in FIG. 11 indicate the density levels obtained by the conversion performed by the respective dot separation circuits 408, 409, 410.

By way of example, the pixels over a range of three lines from line 1 to line 3 indicate the results of processing executed by the dot separation circuit 409. This shows that the degree to which density is lowered increases from line 1 to line 3.

Similarly, the pixels over a range of two lines from line 4 to line 5 indicate the results of processing executed by the dot separation circuit 408. This shows that the degree to which density is lowered increases from line 4 to line 5.

Likewise, the pixels over a range of four lines from line 6 to line 9 indicate the results of processing executed by the dot separation circuit 410. This shows that the degree to which density is lowered increases from line 6 to line 9.

By virtue of the processing described above, dots are formed at random intervals in the sub-scan direction at low density. As a result, neighboring pixels can be prevented from overlapping in the sub-scan direction. In addition, it is possible to reduce output image unevenness caused by slightly irregular rotation of the photosensitive drum, poor precision of the polygon mirror surfaces and skewing of the shaft of the polygon mirror motor.

In accordance with this embodiment, manipulating the dot formation period pseudo-randomly also makes it possible to reduce the interference pattern referred to as moiré, which is a problem that arises when an output image is formed by an area-modulating reproduction image forming apparatus based upon digital image data obtained by scanning and reading a screen-type document image.

[Second Embodiment]

The image processing circuit (FIG. 4) of the above-described embodiment can be applied to an electrophotographic full-color image forming apparatus having a plurality of photosensitive drums.

Figure 12:
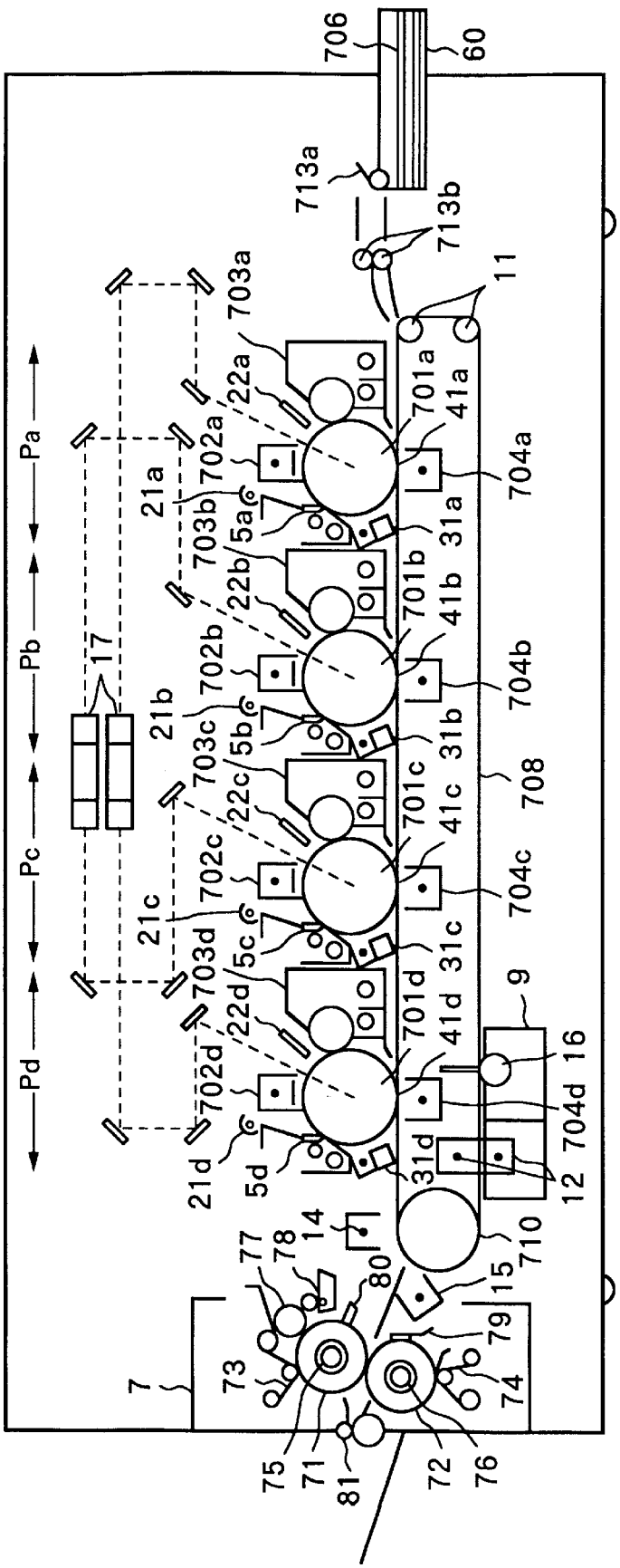
FIG. 12 is a diagram showing the construction of an image processing apparatus according to a third embodiment of the invention.

FIG. 12 is a sectional view showing the construction of an electrophotographic full-color image forming apparatus according to this embodiment of the invention.

As shown in FIG. 12, the apparatus has four stations which form images of the four colors magenta, cyan, yellow and black. Photosensitive drums 701a~701d are uniformly charged by primary corona discharge units 702a~702d, respectively. Light beams emitted by laser diodes (not shown) driven by the image signals (digital image data) of the respective colors are made to scan and expose the photosensitive drums 701a~701d by polygon mirrors 17, thereby forming latent images on the drums.

The latent images are developed by developing units 703a~703d so that toner images are formed on the photosensitive drums 701a~701d.

Recording paper 706 picked up from a recording paper tray 60 and attracted to a transfer belt 708 with the assistance of a registration roller 713b is transported by the belt. The plurality of toner images are brought into registration with the recording paper 706 and are successively transferred to the paper by transfer corona discharge units 704a~704d so as to be superimposed on one another.

Next, the recording paper 706 is separated from the transfer belt 708 by a separating corona discharge unit 14 and by the curvature of a recording paper holding roller 710. The toner images are fixed to the recording paper 706 by a fixing roller 71 and pressure roller 72 and the recording paper 706 is discharged from the image forming apparatus.

The fixing process will described in greater detail.

The fixing roller 71 is a metallic pipe the surface of which is covered with silicone rubber and fluorine rubber. The pressure roller 72 is a metal roller the surface of which is covered with silicone rubber. Halogen lamps 75, 76 are controlled by a thermister 79 and temperature control circuit (not shown) attached to the surface of the pressure roller, whereby the surface temperature of the pressure roller is regulated to a constant value suited to fixing the toner images.

Silicone oil in an oil reservoir is moved to an oil coating roller 77 via a pumping roller 78, and the oil coating roller 77 is sequentially controlled so as to make and break contact with the fixing roller 71. A fixed amount of oil is maintained on the fixing roller 71 by an oil control blade 80.

Cleaning units 73 and 74 use belt-shaped cleaning webs which, by being paid out and wound up, clean the rollers 71 and 72 by a clean surface at all times.

Figure 13B:
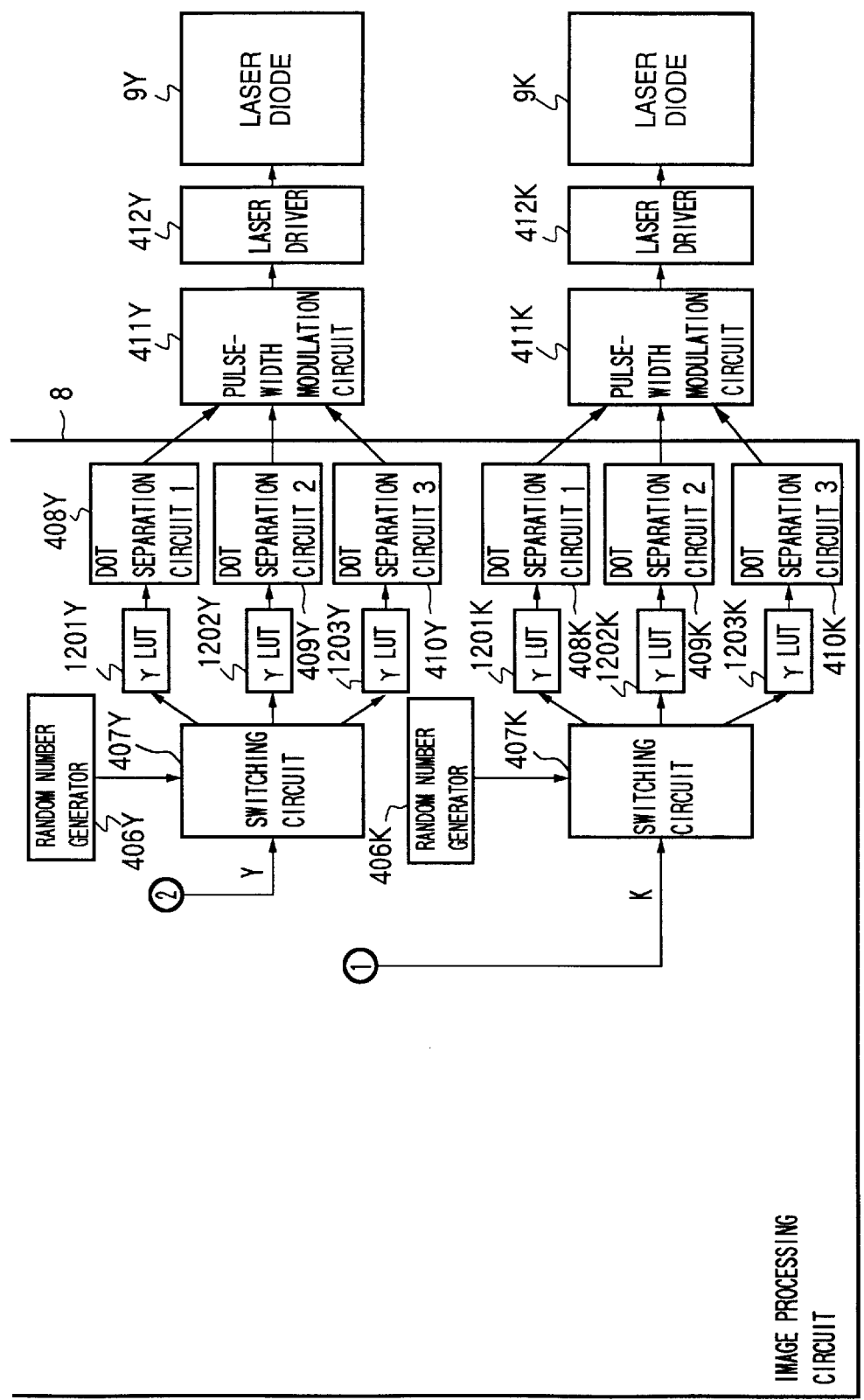

Image processing in an electrophotographic full-color image forming apparatus according to the second embodiment will now be described with reference to FIGS. 13A and 13B.

Three color signals R, G, B resulting from color separation are subjected to a logarithmic conversion by a LOG conversion circuit 404, after which M (magenta), C (cyan), Y (yellow) and K (black) image data is produced by a masking UCR unit 1401.

In a manner similar to that described above with reference to FIG. 4, switching circuits 407M, 407C, 407Y, 407K select line width for dot separation processing in the sub-scan direction in the low-density area and select γ LUTs (one of γ LUTS 1201M, 1202M, 1203M, one of γ LUTs 1201C, 1202C, 1203C, one of γ LUTs 1201Y, 1202Y, 1203Y and one of γ LUTs 1201K, 1202K, 1203K) and corresponding low-density, sub-scan dot separation circuits (one of dot separation circuits 408M, 409M, 410M, one of dot separation circuits 408C, 409C, 410C, one of dot separation circuits 408Y, 409Y, 410Y and one of dot separation circuits 408K, 409K, 410K) on the basis of selection signals produced by respective random number generating circuits 406M, 406C, 406Y, 406K.

The image data of each of the colors modulated by the selected γ LUTs and sub-scan dot separation circuits is converted to a laser emission pattern, which is capable of area modulation reproduction, by a respective one of pulse-width modulation circuits (411M, 411C, 411Y, 411K). The processing involving the respective laser drivers and laser diodes is as described above in conjunction with FIG. 4 and need not be described again.

Thus, in accordance with this embodiment, the dot formation period is changed color by color, thereby making it possible to avoid the occurrence of periodic moire patterns.

[Third Embodiment]

Figure 14:
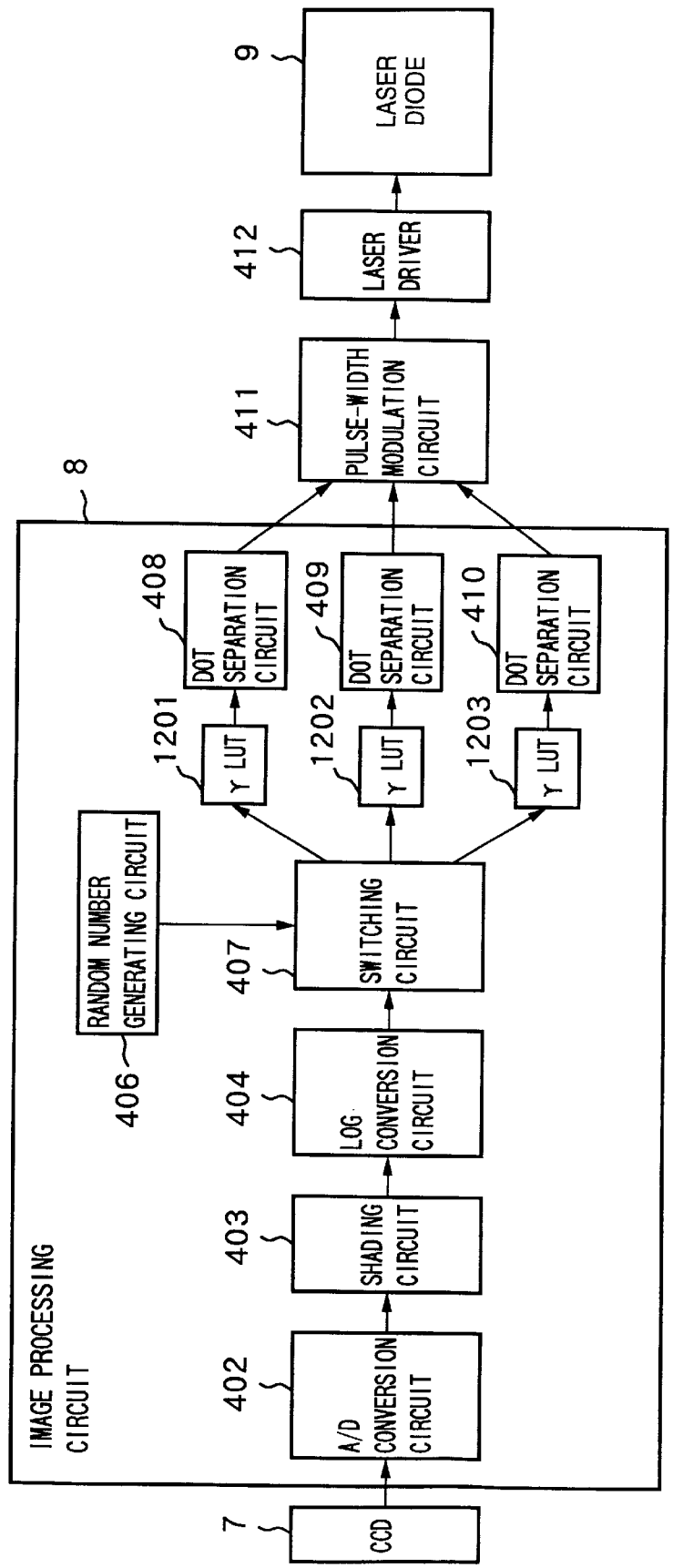
FIG. 14 is a diagram showing the construction of an image processing apparatus according to the second embodiment.

Image processing according to a third embodiment of the invention is illustrated in FIG. 14.

The image processing arrangement of the third embodiment differs from that of the first embodiment in that the printer γ LUT (405 FIG. 4), which executes grayscale characteristic conversion processing, is optimized for each of the dot separation circuits (408, 409, 410). The resulting γ LUTs are mutually independent γ LUTs 1201, 1202, 1203 for respective ones of the dot separation circuits 408, 409, 410. Another difference is that the γ LUTs 1201, 1202, 1203 are placed between the switching circuit 407 and the dot separation circuits 408, 409, 410.

The reason for adopting this arrangement in which the γ conversion is performed separately for each of the dot separation circuits 408, 409, 410 is that each of the dot separation circuits have subtly different characteristics from one another, thus making it necessary to perform a γ conversion suited to each dot separation circuit.

By adopting this arrangement, a grayscale shift due to separation of each of the low-density dots can be corrected and it is possible to greatly improve accuracy in relation to grayscale reproduction.

It should be noted that the image processing apparatus of this embodiment has been described taking a laser printer as an example. However, this does not impose a limitation upon the present invention and the invention is applicable also to an ink-jet printer described below.

<Description of Apparatus>

Figure 15:
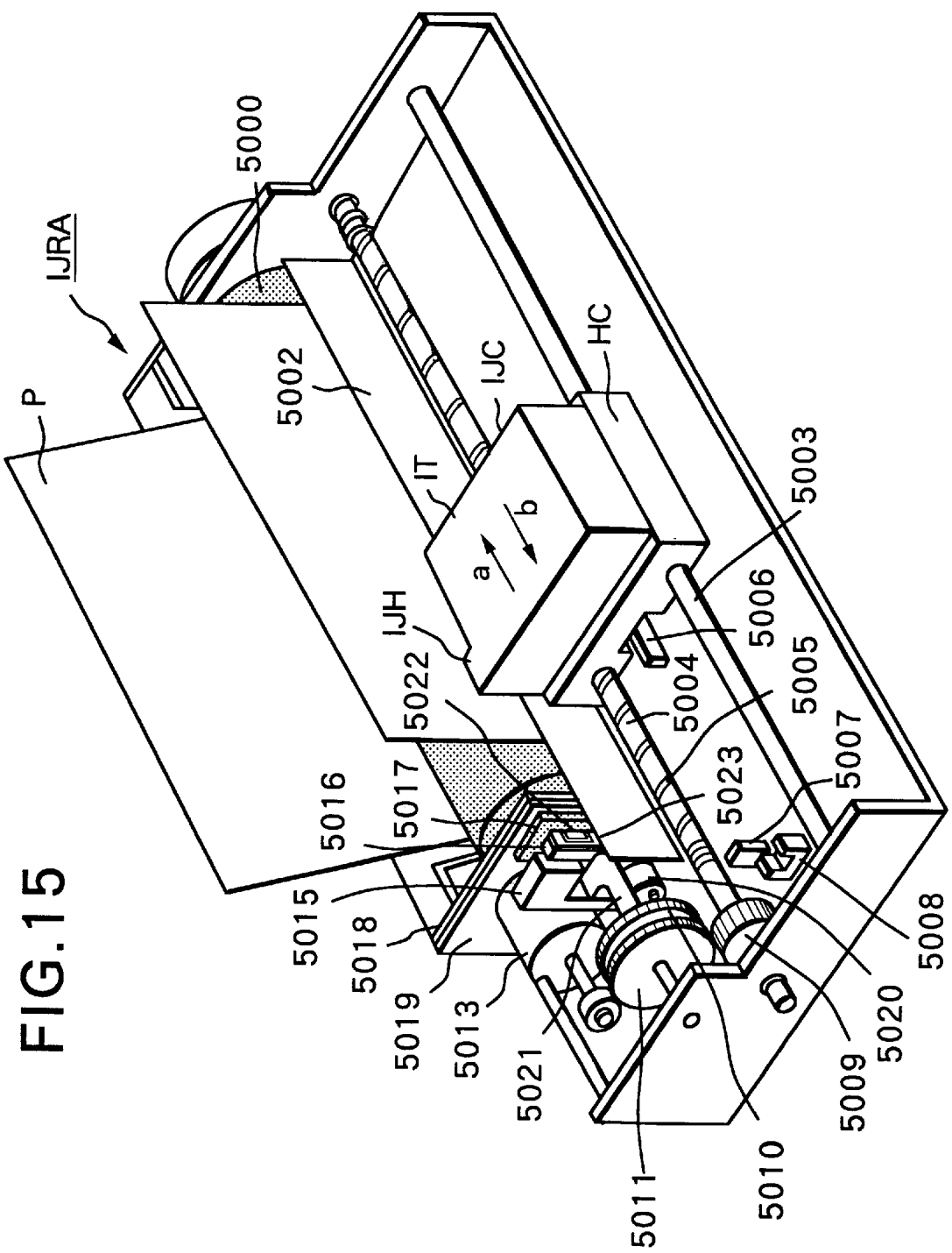
FIG. 15 is an external view showing an ink-jet recording apparatus to which the present invention can be applied.

FIG. 15 is an external view showing an ink-jet recording apparatus to which the present invention can be applied.

As shown in FIG. 15, a carriage HC is engaged with a helical groove 5004 of a lead screw 5005 rotated via driving force transmission gears 5011, 5009 in operative association with the forward and reverse rotation of a driver motor 5013. The carriage HC has a pin (not shown) moved back and forth in directions of arrows a and b. An ink-jet cartridge IJC is mounted on the carriage HC. A paper retaining plate 5002 presses recording paper P against a platen 5000 along the traveling direction of the carriage. Photocouplers 5007, 5008 constitute home position sensing means for verifying the presence of a carriage lever 5006 in the vicinity of the photocouplers and changing over the direction in which the motor 5013 is rotated. A member 5016 supports a cap member 5022, which is for capping the front side of the recording head. Suction means 5015 for applying suction to the cap subjects the cap to suction recovery via an opening 5023 inside the cap. A member 5019 makes it possible to move a cleaning blade 5017 back and forth. The cleaning blade 5017 and the member 5019 are supported on a support plate 5018. It goes without saying that the blade need not be of this type and that a well-known cleaning blade can be applied to this embodiment. A lever 5021, which is for starting the suction of the suction recovery operation, moves with movement of a cam 5020 engaged with the carriage. Movement is controlled by well-known transmission means whereby the driving force from the driver motor is changed over as by a clutch.

It is so arranged that the capping, cleaning and suction recovery operations are performed at the corresponding positions by the action of the lead screw 5005 when the carriage arrives in an area on the home-position side. However, if it is so arranged that the desired operations are performed at well-known timings, this arrangement can also be applied to this embodiment.

<Control>

Next, an arrangement for controlling recording in the apparatus set forth above will be described with reference to the block diagram of FIG. 16.

Figure 16:
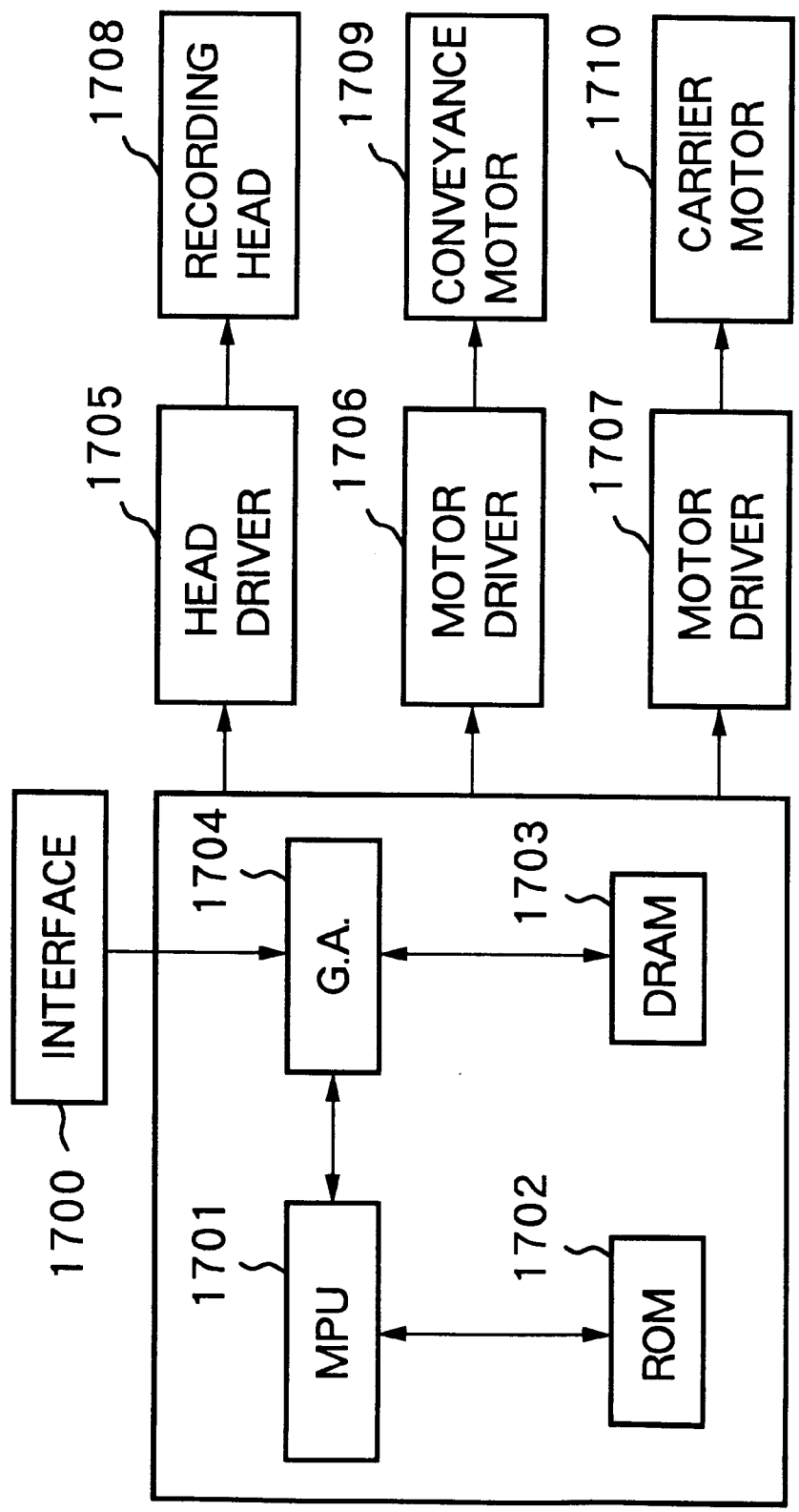
FIG. 16 is a diagram showing a control arrangement for controlling recording by the ink-jet recording apparatus of FIG. 15.

The control circuit shown in FIG. 16 includes an interface 1700 for entering a recording signal, an MPU 1701, a program ROM 1702 for storing a control program executed by the MPU 1701, a dynamic RAM in which various data is saved (the above-mentioned recording signal as well as recording data supplied to a recording head 1708), and a gate array 1704 for controlling supply of recording data to the recording head 1708 and for controlling transfer of data between the MPU 1701 and RAM 1703. A carrier motor 1710 transports the recording head 1708, and a conveyance motor 1709 conveys recording paper. A head driver 1705 drives the recording head, and motor drivers 1706, 1707 drive the conveyance motor 1709 and carrier motor 1710, respectively.

Operation is as follows: When a recording signal enters the interface 1700, the gate array 1704 and MPU 1701 cooperate to convert the recording signal to recording data for printing. The motor drivers 1706, 1707 are driven so that the recording head 1708 is actuated and performs printing in accordance with the recording data sent to the head driver 1705.

It is possible to incorporate the elements of the present invention in the above-described arrangement for control of an ink-jet printer. Therefore it should be obvious that the present invention is not limited to a laser printer but is applicable to the above-mentioned ink-jet printer as well.

The processing steps constituting the important features of the embodiments of the invention will now be described with reference to the flowchart of FIG. 17.

Figure 17:
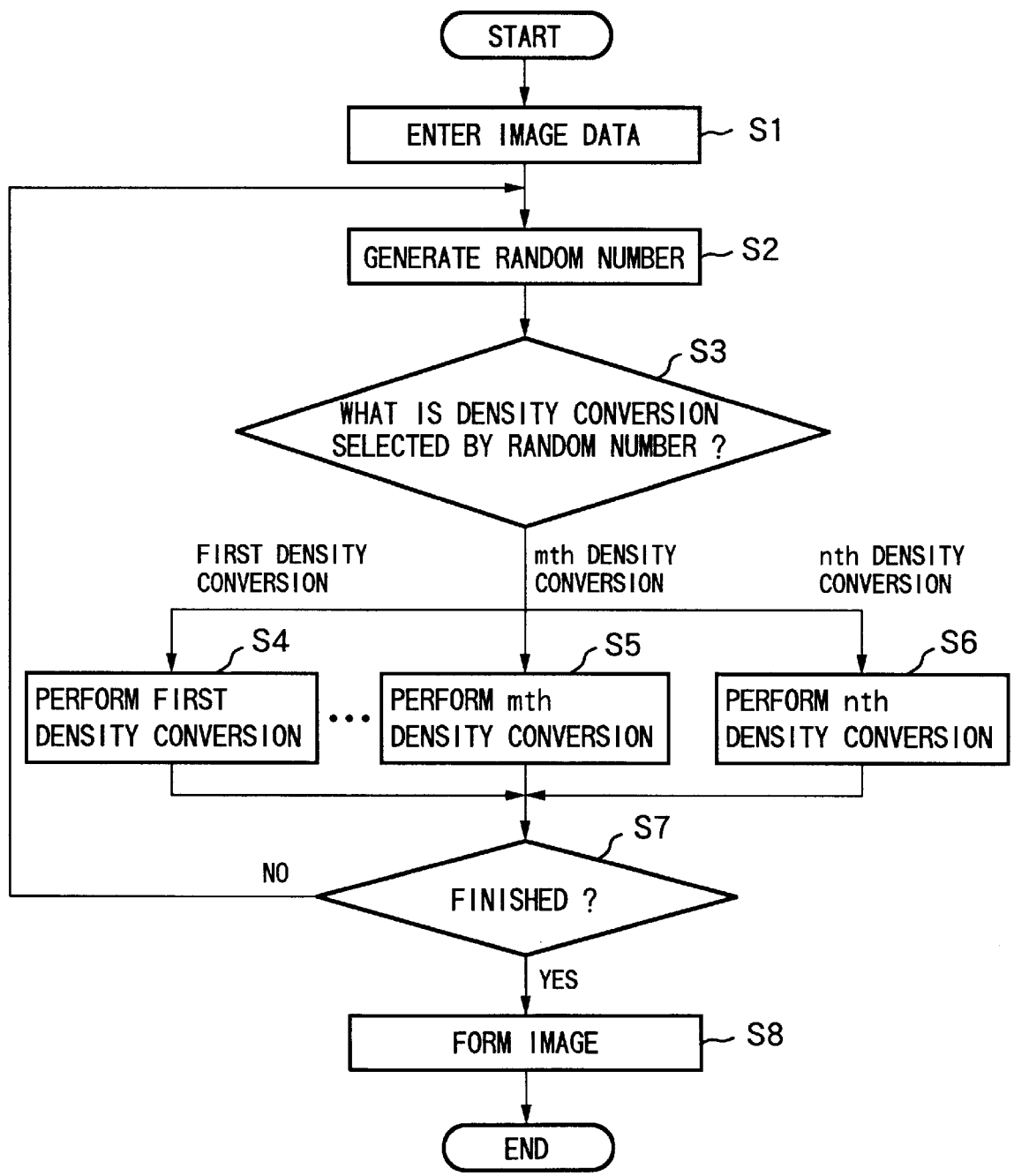
FIG. 17 is a flowchart useful in describing image processing steps according to the present invention.

It should be noted that the program corresponding to the flowchart of FIG. 17 is stored in the ROM 1701 of FIG. 16 and is executed by the MPU 1701.

Image data is entered via the interface 1700 at step S1. It is assumed that this input image data has been subjected to a shading correction, logarithmic conversion and γ conversion.

Figure 6:
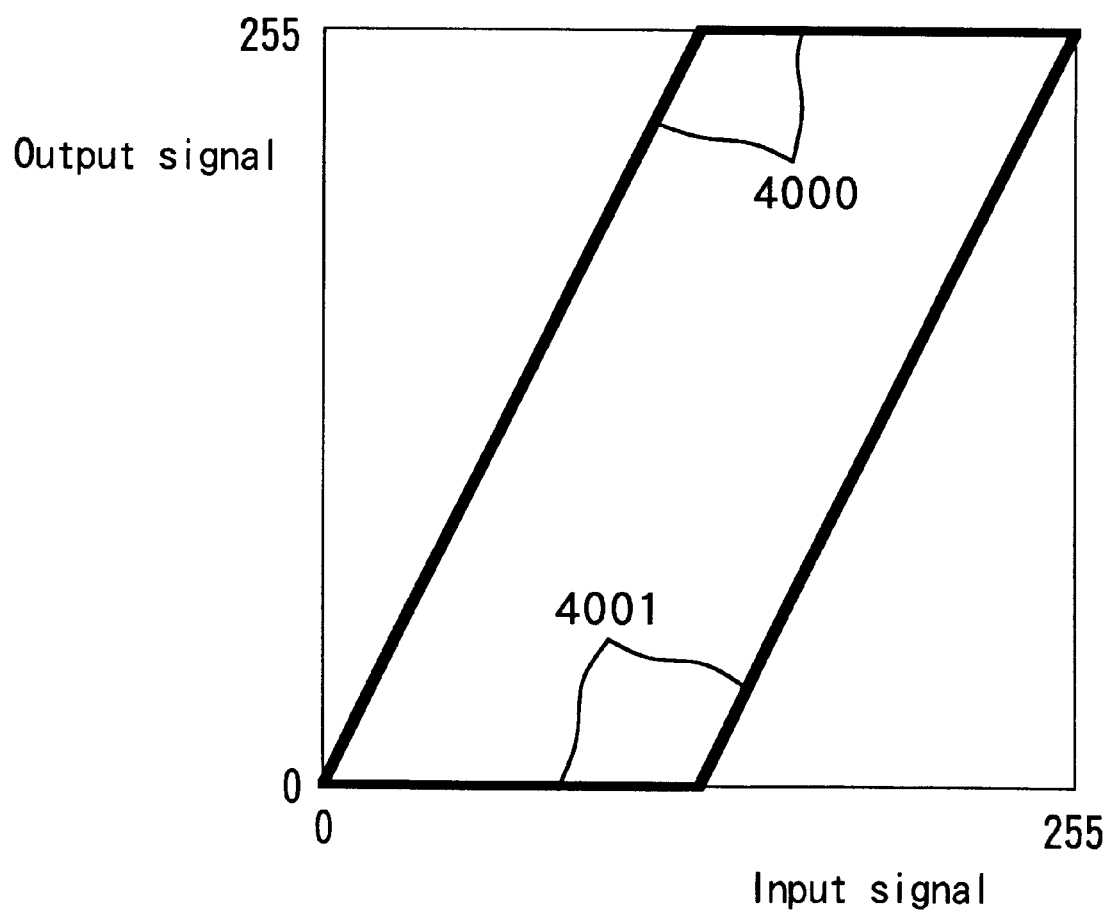
FIG. 6 is a diagram illustrating a LUT for first dot separation.
Figure 8:
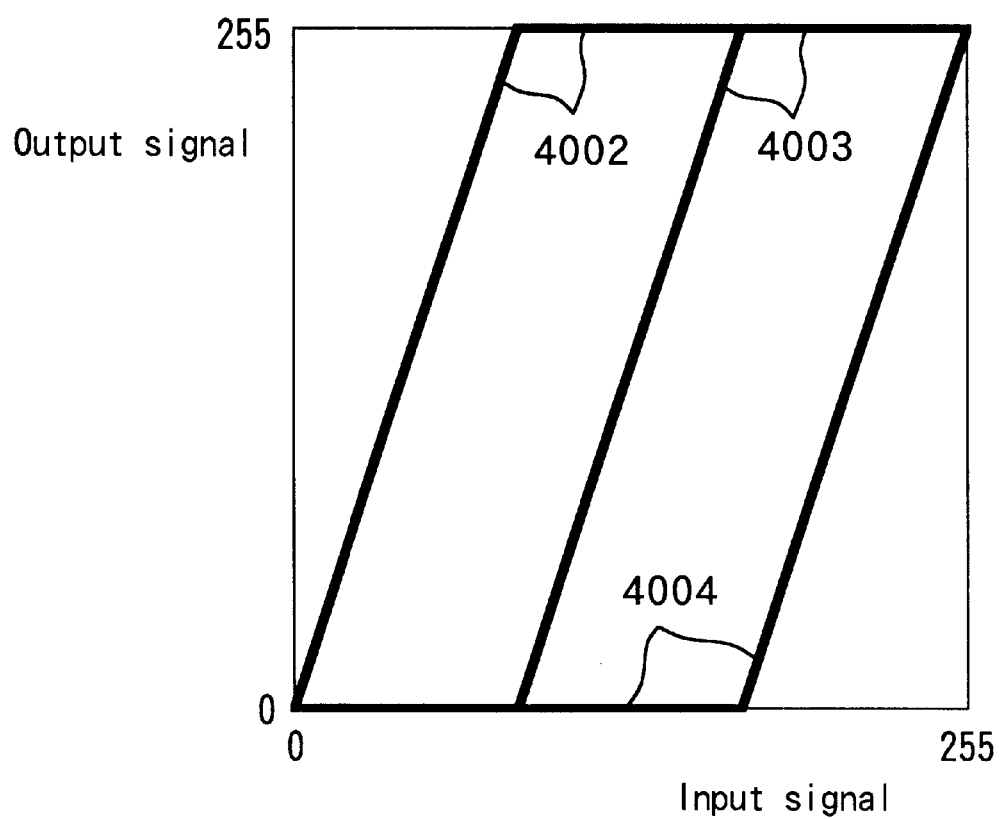
FIG. 8 is a diagram illustrating a LUT for second dot separation.
Figure 10:
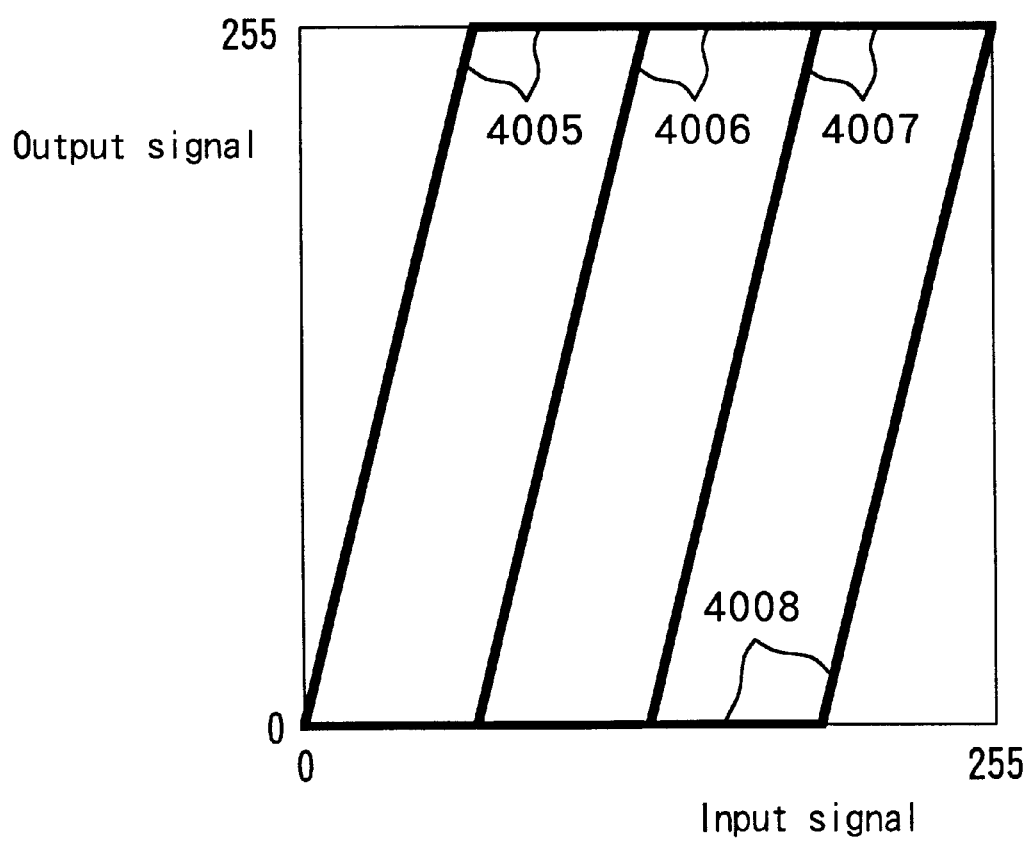
FIG. 10 is a diagram illustrating a LUT for third dot separation.

Next, at step S2, a pseudo-random number is generated for selecting any one of density conversion steps having the mutually different input/output characteristics of the kind shown in FIGS. 6, 8 and 10.

The density conversion processing step corresponding to the generated pseudo-random number is selected at step S3.

Data of a prescribed number of lines is subjected to a density conversion at steps S4, S5, S6 based upon the corresponding input/output characteristics described earlier.

It is determined at step S7 whether the conversion of all image data has been completed. If the answer is "YES", then the program proceeds to step S8; otherwise, the program returns to step S2, at which the same processing is repeated with regard to the next line of image data.

An image is formed at step S8 based upon the image data that has undergone the density conversion.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Figure 18:
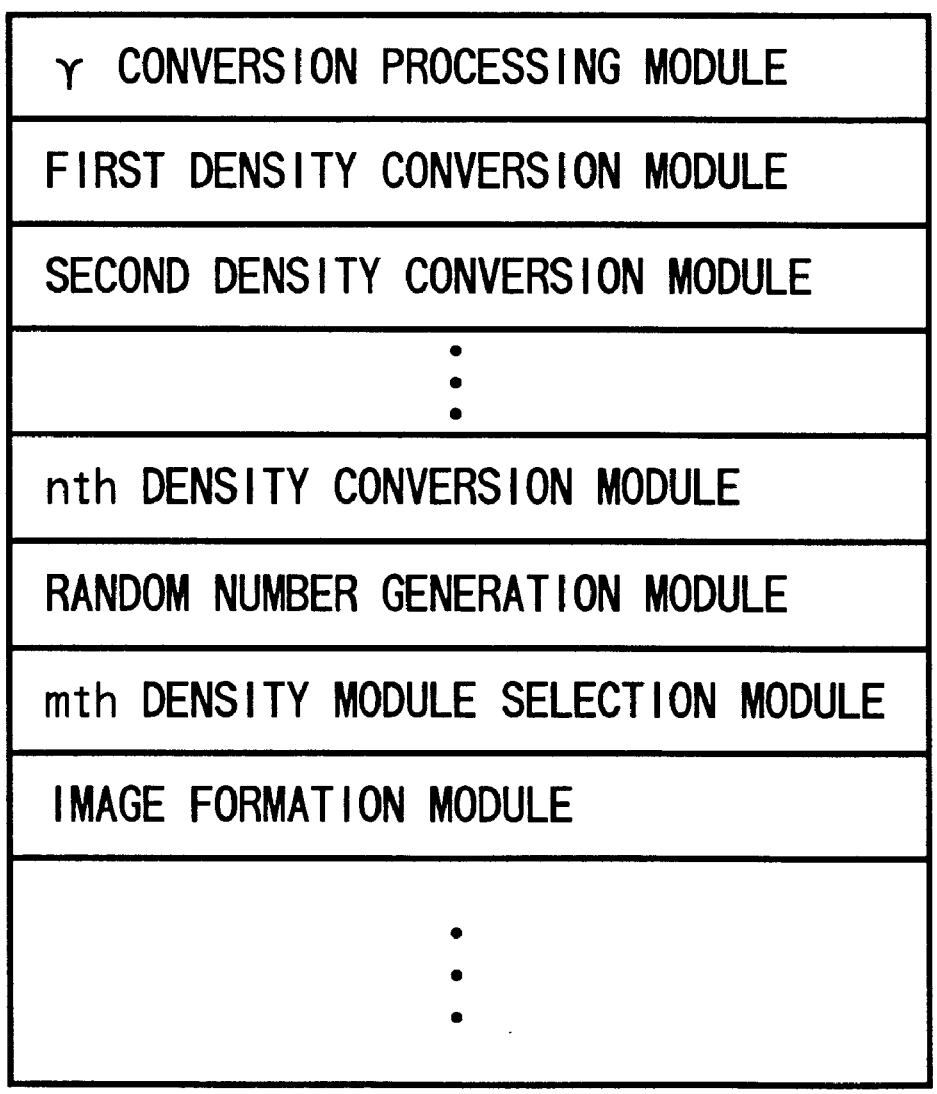
FIG. 18 is a diagram showing an example of the layout of modules of a processing program on a recording medium capable of being read by a computer in which the processing program, which corresponds to the flowchart of FIG. 17, has been stored.

In a case where the present invention is applied to the above-mentioned storage medium, program codes corresponding to the flowchart described earlier are stored on this storage medium. More specifically, modules illustrating an example of the memory map of FIG. 18 are stored on the storage medium.

Specifically, it will suffice to store program codes of at least a "γ conversion processing module" for subjecting input image data to a γ conversion, a "random number generation module" which generates a pseudo-random number for deciding which module of a plurality of density conversion modules is to be used to perform a density conversion, an "mth density conversion module selection module" for selecting one density conversion module based upon the random number generated by the pseudo-random number generation module, a "first density conversion module", "second density conversion module", . . . , "nth density conversion module" having density conversion input/output characteristics that differ from one another for performing a density conversion, and an "image formation module" for forming an image based upon image data than has undergone a density conversion.

Thus, in accordance with each of the embodiments described above, an image forming apparatus for performing scanning recording based upon entered digital image data is provided with a plurality of dot separation circuits for modulating digital image data which differs for every scanning line, the modulation being applied to sets of one or more scanning lines. By randomly selecting and using the plurality of dot separation circuits, an excellent image can be formed with little pitch unevenness and moiré.

In accordance with the present invention, as described above, it is possible to provide an image processing method, apparatus and storage medium through which a high-quality image can be formed by controlling the density conversion characteristic.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for subjecting line-direction image data of first through n-th neighboring lines in image data to a density conversion and generating data for image formation, comprising:

a density conversion step of subjecting each of the first through n-th lines of line-direction image data to a density conversion using a different conversion characteristic for each line in every m (1<m<n) lines;

wherein a plurality of values of the value m is set while the density conversion is performed, in said density conversion step, for the first through n-th lines of line-direction image data.

2. The method according to claim 1, wherein the value m is an integer of 2 or greater.

3. An image processing method for subjecting line-direction image data of first through n-th neighboring lines in image data to a density conversion and generating data for image formation, comprising:

a first density conversion step of subjecting each of first through x-th lines of line-direction image data to a density conversion using a different conversion characteristic for each line;

a second density conversion step of subjecting each of first through y-th lines of line-direction image data to a density conversion using a different conversion characteristic for each line; and a third density conversion step of subjecting each of first through z-th lines of line-direction image data to a density conversion using a different conversion characteristic for each line;

wherein x, y and z are numbers that differ from one another, density conversion is performed upon randomly selecting any one of the first through third density conversion steps, and density conversion of the image data from the first through the n-th lines is executed by repeating the random selection of the density conversion steps.

4. The method according to claim 3, wherein said conversion characteristics are such that density of the first line of line-direction image data is emphasized and degree to which line-direction image data from the line following the first line through the n-th line is emphasized is gradually reduced in the direction from the first line to the n-th line.

5. The method according to claim 3, wherein x is 2, y is 3 and z is 4.

6. The method according to claim 3, wherein image data that undergoes a density conversion at the first through third density conversion steps is subjected in advance to a γ conversion using a γ characteristic that is different for each density conversion step.

7. An image processing method for subjecting line-direction image data of first through n-th neighboring lines in image data to a density conversion and generating data for image formation, comprising:

a plurality of density conversion steps from first through Mi-th (Mi=1, 2, . . . , m) density conversion steps of subjecting each of first through Xi-th (Xi=1, 2, . . . , m) lines of line-direction image data to a density conversion using a different conversion characteristic for each line;

wherein density conversion is performed upon randomly selecting any one of density conversion steps up to the Mi-th density conversion step, and density conversion of the image data from the first through the n-th lines is executed by repeating the random selection of the density conversion steps.

8. The method according to claim 7, wherein said conversion characteristics are such that density of the first line of line-direction image data is emphasized and degree to which line-direction image data from the line following the first line through the Xi-th line is emphasized is gradually reduced in the direction from the first line to the Xi-th line.

9. The method according to claim 7, wherein n is an integer of 2 or greater.

10. The method according to claim 7, wherein image data that undergoes a density conversion at each of the density conversion steps up to the Mi-th step is subjected in advance to a γ conversion using a γ characteristic that is different for each density conversion step.

11. The method according to claim 7, wherein the image data is color data and the data of each color component of the color image data is subjected to a density conversion at each of the density conversion steps up to the Mi-th density conversion step.

12. The method according to claim 7, further comprising an image forming step of forming an image based upon image data that has been subjected to the density conversion at each of the density conversion steps.

13. The method according to claim 12, wherein the image is formed by a laser beam at said image forming step.

14. The method according to claim 12, wherein the image is formed by an ink-jet recording method at said image forming step.

15. An image processing apparatus for subjecting line-direction image data of first through n-th neighboring lines of image data to a density conversion and generating data for image formation, comprising:

density conversion means for subjecting each of the first through n-th lines of line-direction image data to a density conversion using a different conversion characteristic for each line in every m (1<m<n) lines;

wherein a plurality of values of the values m is set while the density conversion is performed, by said density conversion means, for the first through n-th lines of line-direction image data.

16. The method according to claim 15, wherein the value m is an integer or 2 or greater.

17. An image processing apparatus for subjecting line-direction image data of first through n-th neighboring lines in image data to a density conversion and generating data for image formation, comprising:

first density conversion means for subjecting each of first through x-th lines of line-direction image data to a density conversion using a different conversion characteristic for each line;

second density conversion means for subjecting each of first through y-th lines of line-direction image data to a density conversion using a different conversion characteristic for each line;

third density conversion means for subjecting each of first through z-th lines of line-direction image data to a density conversion using a different conversion characteristic for each line; and selecting means for randomly selecting any one of said first through third density conversion means;

wherein x, y and z are numbers that differ from one another, density conversion is performed using the density conversion means selected by said selecting means, and density conversion of the image data from the first through the n-th lines is executed by repeating the random selection of the density conversion means.

18. The apparatus according to claim 17, wherein said conversion characteristics are such that density of the first line of line-direction image data is emphasized and degree to which line-direction image from the line following the first line through the n-th line is emphasized is gradually reduced in the direction from the first line to the n-th line.

19. The apparatus according to claim 17, where x is 2, y is 3 and z is 4.

20. The apparatus according to claim 17, further comprising first through third γ conversion means for subjecting image data that undergoes a density conversion by said first through third density conversion means to a γ conversion in advance using a γ characteristic that is different for each density conversion means.

21. An image processing apparatus for subjecting line-direction image data of first through n-th neighboring lines in image data to a density conversion and generating data for image formation, comprising:

a plurality of density conversion means from first through Mi-th (Mi=1, 2, . . . , m) density conversion means for subjecting each of first through Xi-th (Xi=1, 2, . . . , m) lines of line-direction image data to a density conversion using a different conversion characteristic for each line; and selecting means for randomly selecting any one of the density conversion means up to the Mi-th density conversion means;

wherein density conversion is performed using the density conversion means selected by said selecting means, and density conversion of the image data from the first through the nth lines is executed by repeating the random selection of said density conversion means.

22. The apparatus according to claim 21, wherein said conversion characteristics are such that density of the first line of line-direction image data is emphasized and degree to which line-direction image data from the line following the first line through the Xi-th line is emphasized is gradually reduced in the direction from the first line to the Xi-th line.

23. The apparatus according to claim 21, wherein n is an integer of 2 or greater.

24. The apparatus according to claim 17, wherein image data that subjected to a density conversion by each of said density conversion means up to the Mi-th data conversion means is subjected in advance to a γ conversion using a γ characteristic that is different for each density conversion means.

25. The apparatus according to claim 21, wherein the image data is color data and the data of each color component of the color image data is subjected to a density conversion by each of said density conversion means up to the Mi-th density conversion means.

26. The apparatus according to claim 21, further comprising image forming means for forming an image based upon image data that has been subjected to the density conversion by each of said density conversion means.

27. The apparatus according to claim 26, wherein said image forming means forms the image by a laser beam.

28. The apparatus according to claim 26, wherein said image forming means forms the image by an ink-jet recording method.

29. A computer readable storage medium storing an image processing program for subjecting line-direction image data of first through n-th neighboring lines in image data to a density conversion and generating data for image formation, comprising:

a code of a density conversion step of subjecting each of the first through n-th lines of line-direction image data to a density conversion using a different conversion characteristic for each line in every m (1<m<n) lines;

wherein a plurality of values of the value m is set while the density conversion is performed, in said density conversion step, for the first through n-th lines of line-direction image data.

30. A computer readable storage medium storing an image processing program for subjecting line-direction image data of first through n-th neighboring lines in image data to a density conversion and generating data for image formation, wherein a computer uses said storage medium to operate as:

first density conversion means for subjecting each of first through x-th lines of line-direction image data to a density conversion using a different conversion characteristic for each line;

second density conversion means for subjecting each of first through y-th lines of line-direction image data to a density conversion using a different conversion characteristic for each line;

third density conversion means for subjecting each of first through z-th lines of line-direction image data to a density conversion using a different conversion characteristic for each line; and selecting means for randomly selecting any one of said first through third density conversion means;

wherein x, y and z are numbers that differ from one another, and density conversion is implemented using the density conversion means selected by said selecting means, and density conversion of the image data from the first through the n-th lines is executed by repeating the random selection of the density conversion means.

31. A computer readable storage medium storing an image processing program for subjecting line-direction image data of first through n-th neighboring lines in image data to a density conversion and generating data for image formation, wherein a computer uses said storage medium to operate as:

a plurality of density conversion means from first through Mi-th (Mi=1, 2, . . . , m) density conversion means for subjecting each of first through Xi-th (Xi=1, 2, . . . , m) lines of line-direction image data to a density conversion using a different conversion characteristic for each line; and selecting means for randomly selecting any one of the density conversion means up to the Mi-th density conversion means;

wherein density conversion is implemented using the density conversion means selected by said selecting means, and density conversion of the image data from the first through the n-th lines is executed by repeating the random selection of said density conversion means.

32. An image processing apparatus comprising:

input means for inputting image data;

density conversion means for subjecting the image data to a density conversion in which the density conversion is performed at least by first density conversion mode converting density in a first cycle and second density conversion mode, which converts density in a different cycle of the first cycle, converting density in a second cycle; and control means for controlling said density conversion means so as to mix the first and second density conversion modes for an image plane of the image data.

33. The apparatus according to claim 32, further comprising image forming means for forming an image on the basis of image data performed density conversion by said density conversion means.

34. The apparatus according to claim 33, wherein said image forming means forms the image by using a laser beam.

35. The apparatus according to claim 33, wherein said image forming means forms the image by an ink-jet recording method.

36. The apparatus according to claim 33, wherein said image forming means includes pulse-width modulation means for performing pulse-width modulation to the image data by using a patterned signal having predetermined period of time.

37. The apparatus according to claim 33, wherein the first and the second density conversion modes of said density conversion means subjects a plurality of lines of the image data to a density conversion using a different conversion characteristic for each of lines in the first and the second cycle, and said image forming means forms the image by performing line-scan with image data outputted from said density conversion means.

38. The apparatus according to claim 37, wherein the first cycle represents m lines of period of time and the second cycle represents n (n≠m) lines of period of time.

39. The apparatus according to claim 32, wherein the image data is color image data.

40. The apparatus according to claim 32, wherein, in the first and second density conversion modes of said density conversion means, the density conversion in each of the first and the second cycle is performed by using at least two kinds of conversion characteristics.

41. The apparatus according to claim 32, wherein said control means controls to select the first and the second density conversion modes at random.

42. An image processing method comprising:

an input step of inputting image data;

a density conversion step of subjecting the image data to a density conversion in which the density conversion is performed at least by first density conversion mode converting density in a first cycle and second density conversion mode, which converts density in different cycle of the first cycle, converting density in a second cycle; and a control step, when said density conversion step is performed, of controlling so as to mix the first and the second density conversion modes for an image plane of the image data.

43. A computer-readable storage medium storing program codes of an image processing method, comprising:

a code of an input step of inputting image data;

a code of a density conversion step of subjecting the image data to a density conversion in which the density conversion is performed at least by first density conversion mode converting density in a first cycle and second density conversion mode, which converts density in different cycle of the first cycle, converting density in a second cycle; and a code of a control step, when said density conversion step is performed, of controlling so as to mix the first and the second density conversion modes for an image plane of the image data.

* * * * *